United States Patent [19]
Özveren et al.

[11] Patent Number: 5,553,264
[45] Date of Patent: Sep. 3, 1996

[54] METHOD AND APPARATUS FOR EFFICIENT CACHE REFILLING BY THE USE OF FORCED CACHE MISSES

[75] Inventors: Cüneyt M. Özveren, Somerville; Robert J. Walsh, Ashland; Greg Waters, Groton, all of Mass.

[73] Assignee: Digital Equipment Corporation, Maynard, Mass.

[21] Appl. No.: 265,543

[22] Filed: Jun. 24, 1994

[51] Int. Cl.$^6$ .................................................. G06F 12/12
[52] U.S. Cl. ..................... 395/462; 395/460; 364/243.4; 364/243.41; 364/243.45; 364/DIG. 1
[58] Field of Search ..................................... 395/800, 425, 395/400, 460, 462, 447, 449; 364/760, DIG. 1

[56] References Cited

U.S. PATENT DOCUMENTS

| | | | |
|---|---|---|---|
| 5,001,663 | 3/1991 | Parulski et al. | 364/760 |
| 5,155,832 | 10/1992 | Hunt | 395/425 |
| 5,206,941 | 4/1993 | Eikill et al. | 395/425 |
| 5,426,765 | 6/1995 | Stevens et al. | 395/425 |

*Primary Examiner*—Meng-Ai T. An
*Attorney, Agent, or Firm*—Christine M. Kuta

[57] ABSTRACT

In the present invention, one of the bits in the tag value in the cache is hard-wired, for example, to 0, at such a position in the cache that that bit is always set to 0 when a tag is stored in the cache (or forced to 0 when a tag is read from the cache). Instructions executed by the processor can specify a read outside the cache, i.e. of the most recent data written to the main memory by some DMA agent, by specifying a read address with the designated bit equal to one. In this way, a cache miss is forced, allowing the processor to read the most recent data from the main memory of the system and to cache the data. As the cache is refilled from the main memory, the hard-wired tag bit of course remains set to zero. So later processor instructions that read data within the same cache refill block would use the normal address of that data (having the designated bit set to zero). These subsequent reads will not force a cache miss. Instructions executed by the processor can flush the cache by reading a sequence of addresses in which the designated tag bit is one. Since the designated bit is 0 in all cache tags, there will be misses on all words, so the entire cache will be filled from the main memory.

6 Claims, 5 Drawing Sheets

METHOD AND APPARATUS FOR EFFICIENT CACHE REFILLING BY THE USE OF FORCED CACHE MISSES

FIELD OF THE INVENTION

The present invention relates generally to computer systems and, more particularly, to efficiently replacing stale data in a cache memory.

BACKGROUND OF THE INVENTION

Caches

A typical computer configuration comprises a processor of some kind coupled to a memory of some kind. It is desirable to match the speeds of the processor and the memory, so that the access time of the memory is roughly equal to the rate at which the processor reads and writes instructions and/or data. The processor speed will often be determined by the particular application for which the system is designed, and the required memory speed will follow from the processor speed.

In addition to memory speed the memory size will also have to be determined by the particular application for which the system is designed. The size of the memory must be large enough to accommodate all the information required by the processor for considerable periods of time. Transfers to and from other devices, e.g. hard disks, may be necessary in some systems, but it is desirable for the memory size to be large enough for such transfers to occupy a relatively small proportion of the total memory operating time. In other systems, e.g. routers in communication systems, the memory size must be large enough to store the messages passing through the system for sufficient time for them to received, processed, and retransmitted.

It may be noted that if the main memory is of a suitable type, it may be capable of block transfers which are considerably faster than random accesses. If it is a DRAM, for example, a memory access involves selection of a row followed by the selection of a column. Once that has been done, a block or burst transfer can be achieved by retaining the row selection and simply advancing the column selection word by word. However, this fast block transfer is obviously only possible if the words to be transferred are in a block of sequential addresses. With typical data processing, the sequence of addresses is normally not sequential, and reads and writes normally occur in an apparently random sequence, so fast block transfer cannot normally be used for such processing.

A memory satisfying these two requirements of speed and sufficient capacity is generally expensive and difficult to implement. To solve the problems of memory speed and size, the use of a cache memory has become common. A cache memory has a relatively small size and relatively high speed which is matched to the speed of the processor. The cache memory is used in conjunction with the main memory and allows the speed of the main memory to be considerably less than that of the cache with only a minor adverse impact on the speed of the system.

A cache memory is effectively an associative memory which stores the addresses of the data in it along with the data itself. The data and the addresses may both include parity or other error-checking bits if desired. A cache memory system is organized so that when the processor reads or writes data, such as a word, the address of the word is passed to the cache. If the operation is a write, then the word is written into the cache along with its address. If the access is a read and the address is in the cache, then the word is read from the cache. If the access is a read and the address is not in cache, then the word is read from main memory and written to cache at the same time.

The efficacy of the cache depends on the fact that in most programs, many words are accessed repeatedly. Once a word has entered the cache, subsequent operations on that word are achieved by accessing the cache. Since the cache speed is matched to the processor speed, the processor runs continuously or nearly so, with few waits for memory accesses to the main memory.

The simplest cache system has just a single cache, and both data words and instructions are stored in it. In some circumstances it may be more convenient to have two caches, one for data words and the other for instructions.

Cache structure

A true associative memory would be complex and expensive. A cache memory is therefore normally constructed to store, with each word, only a part of the address of that word. This partial address is called a tag. The cache is addressable in the conventional manner by the remaining part of the word address. When a cache location is addressed, the tag stored in that location is compared with the tag part of the full word address. If there is a match, i.e. a hit, the desired word is contained in the cache. The cache may contain tag comparison circuitry for comparing the tag in the desired address with the tag retrieved from the cache location, or the comparison may be performed by the processor.

Conventionally, the full address is split into a high part and a low part, with the low part being used to address the cache memory and the high part being used as the tag.

Cache operation

The cache organization, as described so far, allows the processor to read words from and write words to the cache provided that their addresses are already in the cache. Obviously, however, there will be times when a required address is not in the cache. There must therefore be a mechanism for entering fresh addresses into the cache. This will involve displacing words already in the cache, so the mechanism must also ensure that such displaced words are not lost but transferred into the main memory.

When a word is written, it is convenient to write it into the cache automatically, without first checking the cache to see whether the address is already present in the cache. What is actually written into the cache is an extended word, formed by concatenating the data word with the tag part of its address. This ensures that the word is cached if its address should be accessed.

When a word is to be read, its address is passed to the cache. If that address is not in the cache, then the address has to be passed to the main memory, so that the word is read from there. As with the write, this type of read ensures that the word is cached if its address should be accessed again. It is convenient for the word being read from the main memory to be copied immediately into cache; this writing occurs in parallel with the processor receiving the word and carrying out whatever operation is required on it.

Both reading and writing can thus result in the writing of a word with a fresh address into the cache, which results in the displacement of a word already in the cache, i.e. the overwriting of the word and its tag in the cache location into which the new word is being written. To avoid losing this displaced word, the system must ensure that it is copied into the main memory before it is displaced. This can conveniently be achieved by making every write, i.e. writing of a word by the processor, a write into main memory as well as into the cache. A write thus consists of writing into cache and main memory simultaneously. A write buffer can be interposed between the cached processor and the main memory, so that the operation of the system is not delayed by the long write time of the main memory if several words have to be written in quick succession.

This solves the displacement problem, because any word displaced from the cache will either be an unchanged copy of a word which has been obtained from and is still in main memory, or will have previously been copied into the main memory.

Variations on this mechanism for avoiding inconsistencies between the main and cache memories may be possible.

Interaction with external systems

The system described so far has been assumed to be largely self-contained: a processor, a main memory, and a cache. In practice, however, this system will usually be only a subordinate part, a subsystem, of a larger system. In particular, the main memory of such a larger system will be accessible by other parts of the system. The system generally includes a system bus to which the main memory is coupled, and the cache and the processor coupled together and coupled to the system bus via an interface unit, which contains a write buffer. The system bus will have various other devices coupled to it, which are called DMA (direct memory access) units. Depending on the system, the DMA units may be, for example, communications units for peripheral units.

The DMA units are so called because they can access the main memory directly, over the system bus, without involving the processor. This results in an inconsistency problem for the cache; since the contents of the main memory can be changed without the knowledge of the processor, the contents of the cache and the main memory can be inconsistent. Such inconsistent values are also called stale values.

This is not a problem as far as the DMA devices are concerned, because any changes made to the cache are copied directly into the main memory. There may in fact be a slight delay in this, because of the buffering of writes from the processor to the main memory, but this will generally not be significant. However, inconsistency between the cache and the main memory is a potentially serious problem as far as the processor is concerned.

Where there is a system with a cache and another agent, such as a DMA unit, where both the processor and the DMA unit may modify the main memory, special care has to be taken to ensure that stale data is not accessed. One method for avoiding the reading of stale data from a cache is invalidating relevant cache entries. The disadvantage of invalidation algorithms is that they incur overhead. In MIPS Computer Systems, Inc. R3000-based systems, for example, the customary algorithm incurs setup overhead to isolate the cache and drain the pipeline, extra instructions for each cache tag to specify what is to be invalidated so that the main memory will be accessed on the next read, and cleanup overhead to reconnect the cache to the main memory. A second method for avoiding the stale data problem is forcing an uncached read. The disadvantage of an uncached read is that the cache is not updated. This is especially important when a compiler is used since poor translation of algorithms may lead to repeated uncached access to the data, and since uncached accesses are expensive. It is also important in a system where the main memory is capable of block memory transfers and reads refer to the same memory block, even if the data is read only once, because individual uncached reads do not take advantage of this block transfer feature. A third method of dealing with stale data is the use of bus snooping mechanisms but additional, and often expensive hardware is required. Bus snooping mechanisms require extra hardware to monitor the memory side of the cache for write operations. They also assume that there is sufficient cache bandwidth available for the snooper to invalidate or update cache lines. This extra bandwidth either represents high cost for esoteric components, if available, or a less powerful CPU implementation.

It remains desirable to have a technique for dealing with the stale data problem in a cache memory by allowing the processor to perform a cached read of fresh data where there are inconsistencies between the cache and the main memory.

SUMMARY OF THE INVENTION

The problems of the processor accessing stale data in the cache are solved by an efficient cache refill scheme where a cache miss is forced by hard-wiring a cache tag value bit to either 1 or 0.

In the present invention, one of the bits in the tag value in the cache is hard-wired, for example, to 0, at such a position in the cache that that bit is always set to 0 when a tag is stored in the cache (or forced to 0 when a tag is read from the cache).

Instructions executed by the processor can specify a read outside the cache, i.e. of the most recent data written to the main memory by some DMA agent, by specifying a read address with the designated bit equal to one. In this way, a cache miss is forced, allowing the processor to read the most recent data from the main memory of the system and to cache the data. As the cache is refilled from the main memory, the hard-wired tag bit of course remains set to zero. So later processor instructions that read data within the same cache refill block would use the normal address of that data (having the designated bit set to zero). These subsequent reads will not force a cache miss.

Instructions executed by the processor can flush the cache by reading a sequence of addresses in which the designated tag bit is one. Since the designated bit is 0 in all cache tags, there will be misses on all words, so the entire cache will be filled from the main memory.

BRIEF DESCRIPTION OF THE DRAWINGS

The present invention together with the above and other advantages may best be understood from the following detailed description of the embodiments of the invention illustrated in the drawings, wherein.

DETAILED DESCRIPTION

Figure 1:
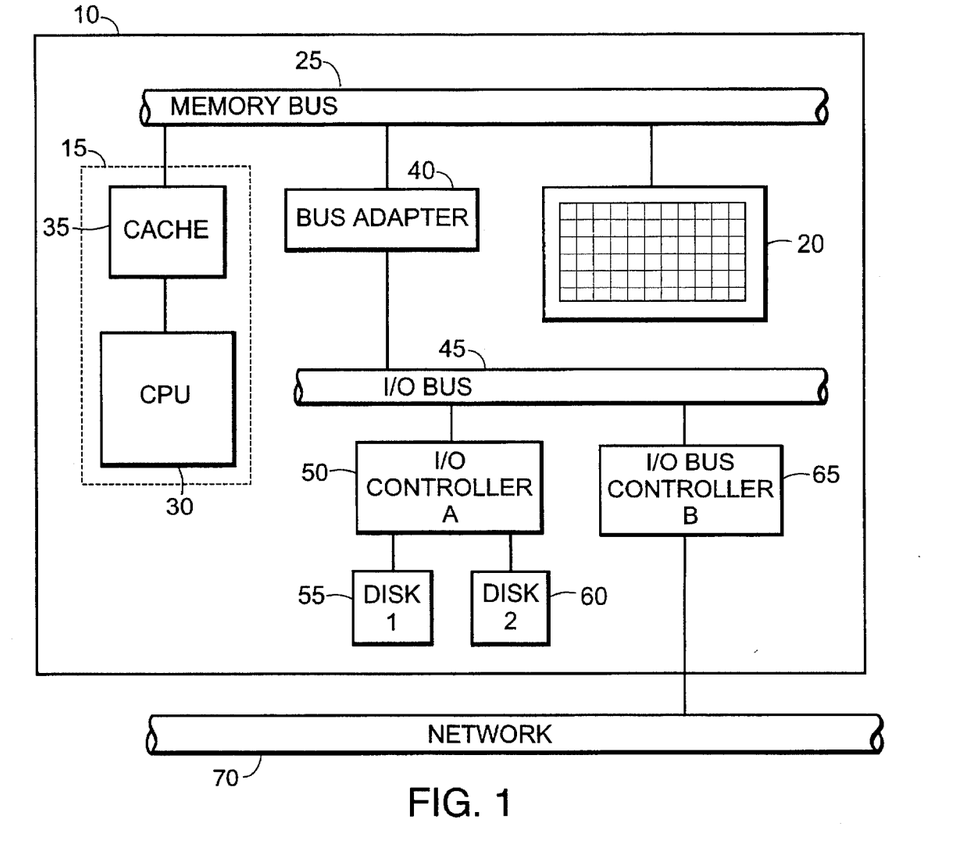
FIG. 1 is a computer system having a cached CPU.

The invention operates in a system such as that shown in FIG. 1. FIG. 1 shows a computer system 10 having a CPU/cache subsystem 15, a main memory 20, and DMA (direct memory access) I/O devices all connected together by a memory bus 25. The CPU/cache subsystem 15 has a CPU 30 and a cache memory 35. In this case, the CPU 30 is connected to the memory bus 25 through the cache memory 35, however there are other configurations for the CPU and the cache which will be described below. The DMA I/O devices are connected to the main memory 20 through a bus adapter 40 and an I/O bus 45. An I/O controller A 50, connected to the I/O bus 45, has two hard disk devices, disk 1 55 and disk 2 60. An I/O controller B 65 is connected between the I/O bus 45 and an external network 70.

If, for example, the CPU/cache subsystem 15 has no snoop protocols, meaning that it does not monitor writes by the DMA I/O devices 50, 65 to the main memory 20, then the CPU 30 and the DMA I/O devices 50, 65 write to the main memory 20 independently of each other. The problem that the invention solves arises when the DMA devices 50, 65 write new data to the main memory 20 and the cache 35 retains old data. When the CPU 30 goes to look for data, it looks at the cache 35 and because the DMA devices 50, 65 write only to the main memory 20 and do not update the cache 35, the CPU 30 may obtain stale data. By forcing a cache miss and reading from the main memory 20, the present invention enables the CPU 30 to access new data.

Figure 2:
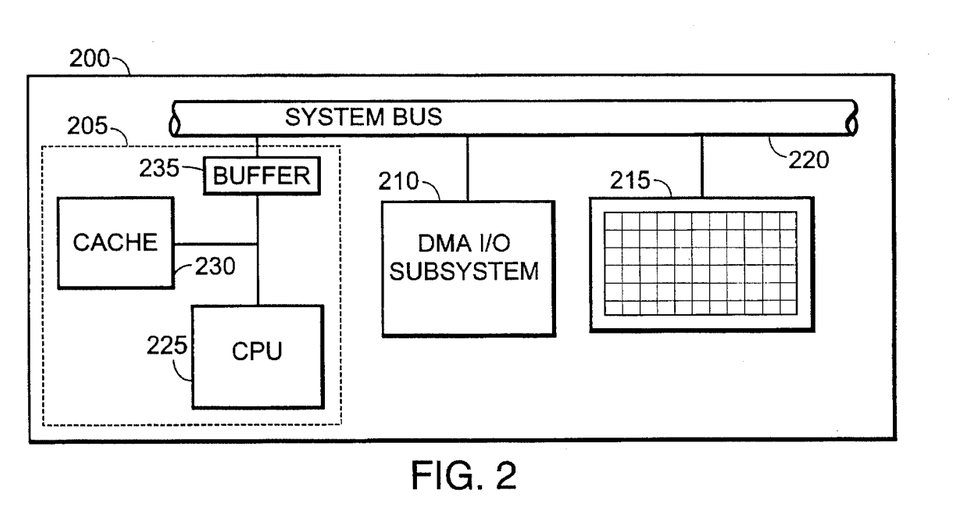
FIG. 2 is a second alternative embodiment of a system having a cached CPU.

FIG. 2 shows an alternative embodiment of a cached CPU system 200. In FIG. 2, a CPU/cache subsystem 205, a DMA I/O subsystem 210 and a main memory 215 are connected together through a system bus 220. The CPU/cache subsystem 205 has a CPU 225, a cache 230 and a buffer 235. Unlike the system 10 in FIG. 1, the cache 230 in this system 200 is off to the side and the CPU 225 and cache 230 are both connected to a system bus 220 through the buffer 235. The DMA I/O subsystem 210 contains various DMA I/O devices such as those found in the system 10 of FIG. 1. Both the CPU 225 and devices from the DMA I/O subsystem 210 write to the main memory 215 independently. The cache 230 is a non-snoopy type of cache meaning that the cache does not monitor writes by the DMA I/O subsystem 210 to the main memory 215. Therefore, the possibility arises of the CPU 225 accessing stale data from the cache 230.

The CPU/cache subsystem 205 may contain, for example, the MIPS Computer Systems, Inc. R3000 chip where the CPU 225 is of the type that the CPU/cache subsystem 205 has no snoop protocols, meaning that it does not monitor writes by the DMA I/O subsystem 210 to the main memory 215. Both the CPU 225 and the DMA I/O subsystem 210 write to the main memory 215 independently of each other. The problem that the invention solves arises when the DMA I/O subsystem 210 writes new data to the main memory 215 and the cache 230 retains old data. When the CPU 225 goes to look for data, it looks at the cache 230 and because the DMA I/O subsystem 210 writes only to the main memory 215 and does not update the cache 230, the CPU 225 may obtain stale data. By forcing a cache miss and reading from the main memory 215, the present invention enables the CPU 225 to access new data.

Figure 3:
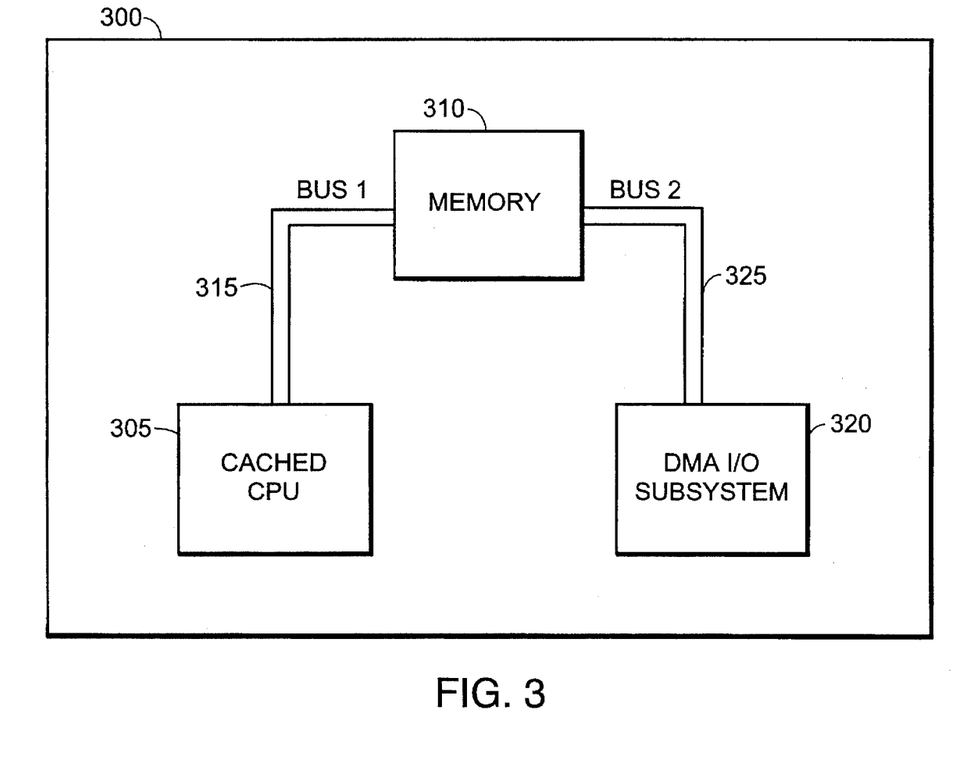
FIG. 3 is a third alternative embodiment of a system having a cached CPU.

FIG. 3 shows a third alternative embodiment of a cached CPU system 300, a multi-ported memory system. A CPU/cache subsystem 305 is connected to a main memory 310 by a first bus 315 and a DMA I/O subsystem 320 is connected to the main memory 310 by a second bus 325. In an alternative configuration, the DMA I/O subsystem 320 could be another CPU subsystem. Further variations include multiple CPU subsystems and multiple DMA I/O subsystems connected to the main memory. In a multi-ported memory, such as that shown in FIG. 3, the write ports do not see each other, therefore any caches present on any of the subsystems, even if they have snoop protocols, are not updated with new data written to the main memory which gives rise to the stale data problem.

Figure 4:
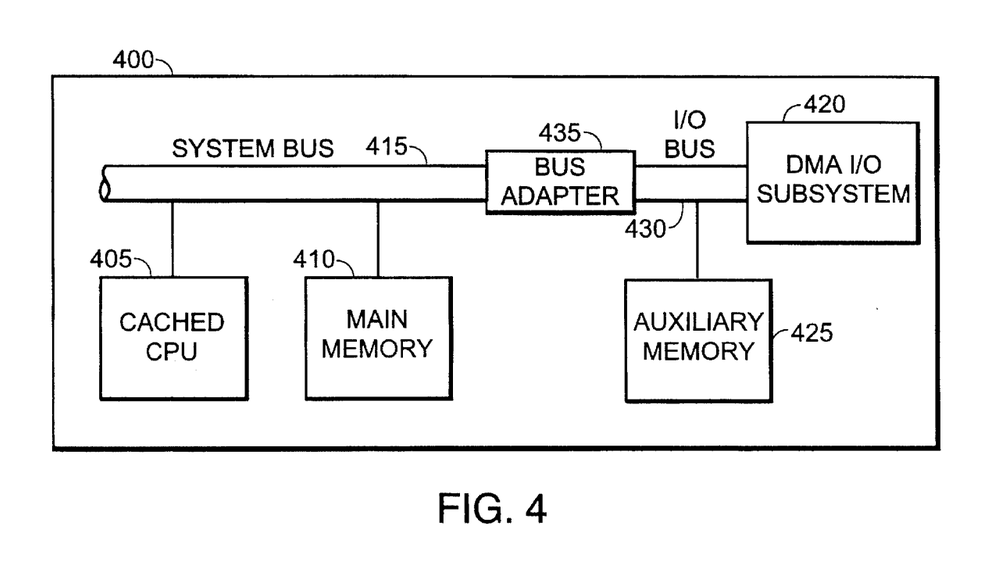
FIG. 4 is a fourth alternative embodiment of a system having a cached CPU.

FIG. 4 shows a fourth alternative embodiment of a cached CPU system 400. A cached CPU 405, that is a CPU subsystem having a cache memory, is connected to a main memory 410 by a system bus 415. A DMA I/O subsystem 420 and an auxiliary memory 425 are connected together by an I/O bus 430. The I/O bus 430 and the system bus 415 are connected together by a bus adapter 435, also called a bridge. In this system 400, the bus adapter 435 isolates the cached CPU 405 from the DMA I/O subsystem 420 and prevents it from monitoring writes to the auxiliary memory 425 by the DMA I/O subsystem 420. So, even if the cached CPU 405 had a snoop protocol, the cached CPU 405 would not be able to monitor the writes to the auxiliary memory 425.

Figure 5:
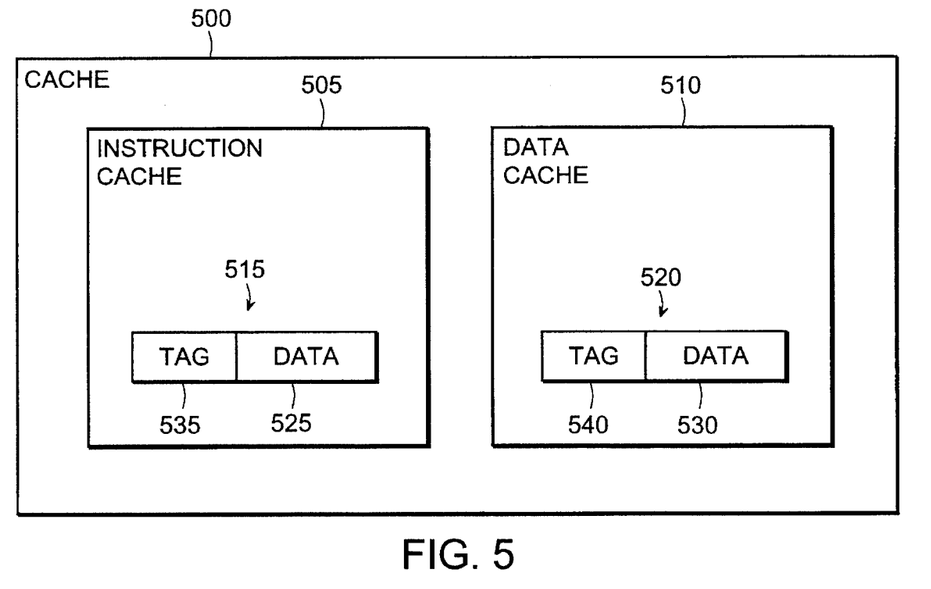
FIG. 5 is a cache.

FIG. 5 shows a cache 500 used in systems, such as those described above, in which the present invention operates. The cache 500 has two parts, an instruction cache 505 for caching instructions and a data cache 510 for caching data. Data is stored in the cache 500 in blocks, also called lines. The instruction cache 505 has a block 515 and the data cache 510 has a block 520. Each block has a data portion 525, 530 and a tag 535, 540. The tags 535, 540 contain the main memory address for the block in the cache and are used by the CPU of a system to discover whether the data that it needs is in the cache 500.

The cache 500 may be a direct-mapped cache or an associative cache. A cache is direct-mapped if a block has only one place in the cache where it can appear. A cache is fully associative if a block can be placed anywhere in the cache. If a block can be placed only in a restricted set of places in the cache, the cache is set associative. The present invention may operate in a direct-mapped cache or in caches with any degree of associativity.

Figure 6:
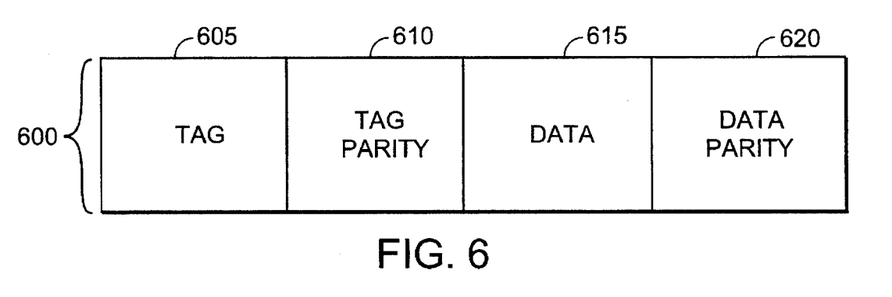
FIG. 6 is a variation of a cache block.

FIG. 6 shows an alternative embodiment of a cache block. The block 600 has a tag portion 605 and a tag parity portion 610 for error-checking the tag value. The block 600 also has a data portion 615 and a data parity portion 620 for error-checking the data value. Other variations of cache blocks are possible. The invention operates on any type block with a tag having at least two bits.

In the present invention, in order to avoid reading stale data in the cache, one or more of the tag bits in the cache is hard-wired to a specific level, for example to 0. The hard-wiring is at such a position that those bits are always set to 0 when a tag is stored in the cache (or forced to 0 when a tag is read from the cache).

Figure 7:
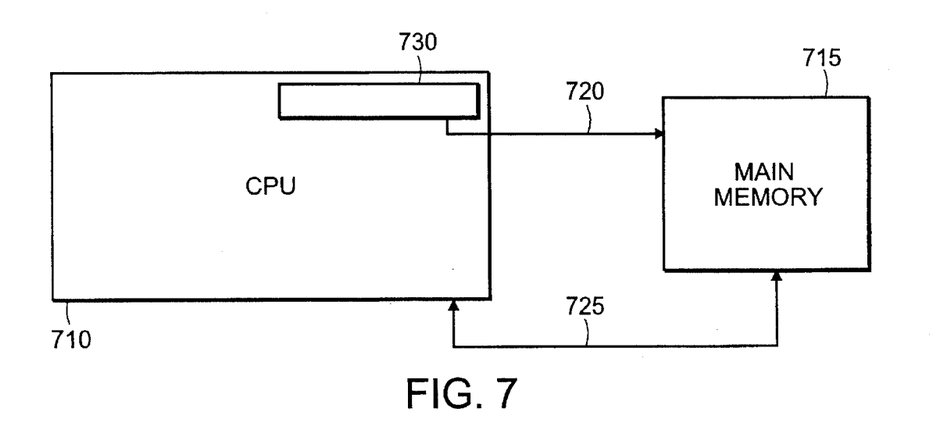
FIG. 7 is an uncached system.

An uncached system is shown in FIG. 7. A CPU 710 is connected to a main memory 715 by an address bus 720 and a data bus 725. The CPU 710 provides memory addresses from an internal register 730 to the main memory 715 using the address bus 720. The data bus 725 is a bidirectional bus. During a write operation, the CPU 710 drives the data bus 725 to specify the data to be stored in the main memory 715 at the location specified by the address bus 720. During a read operation, the main memory 715 drives the data bus 725 with the value stored in the location specified by the address bus 720.

Figure 8:
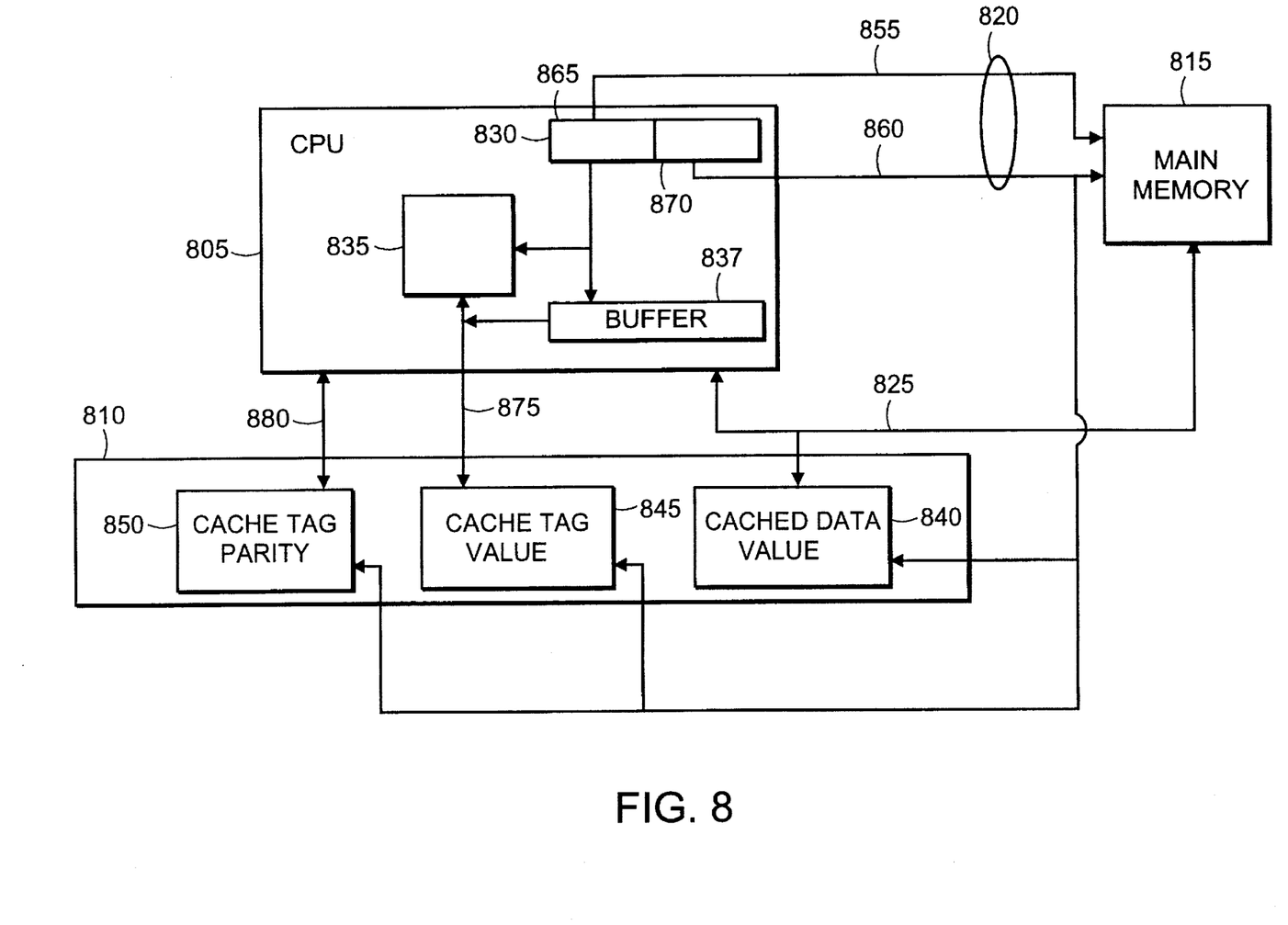
FIG. 8 is a cached system.

A system with a direct-mapped cache memory is shown in FIG. 8. A CPU 805, a cache memory 810 and a main memory 815 are connected together by an address bus 820 and a data bus 825. The CPU 805 has an internal register 830, a comparator 835 and a buffer 837. The cache memory 810 has a cached data value RAM 840, a cache tag value RAM 845 and a cache tag parity and valid bits RAM 850.

The CPU 805 provides memory addresses from the internal register 830 to the main memory 815 using the address bus 820. The address bus 820 is divided into two parts, a high part 855 and a low part 860. The internal register 830 has a corresponding high end 865 and low end 870. The low part 860 of the address bus 820 is used to address the cache 810. The main memory 815 is addressed by a concatenation of the low part 860 and the high part 855 of the address bus 820. An input to the comparator 835 is the high end 865 of the internal register 830.

The data bus 825 may be driven by the CPU 805, the cache data value RAM 840 or the main memory 815, and may only have one driver at any one time. The CPU 805 drives the data bus 825 during a write operation. The cached data value RAM 840 drives the data bus 825 during a read until a cache hit is determined, a cache miss is determined, or the data is latched by the CPU 805. The main memory 815 drives the data bus 825 during a read operation after a cache miss is determined.

A cache tag value bus 875 connects the cache tag value RAM 845 and the comparator 835 and the buffer 837. During a read operation the cache tag value RAM 845 drives the cache tag value bus 875. During a write operation, the value in the high end 865 propagates through the buffer 837 driving the cache tag value bus 875. In an alternative embodiment of the cache tag value bus 875 the cache tag value bus 875 would be time multiplexed with the high part 855 of the address bus 820. The advantage of multiplexing is that fewer pin resources are required for the CPU 805. The disadvantage is that the parallelism, or the overlap, of main memory 815 reads and cache tag value RAM 845 reads is eliminated because the main memory 815 does not have the complete address due to the time multiplexing. This increases read latency when a cache miss occurs.

A cache tag parity bus 880 connects the cache tag parity RAM 850 to the CPU 805. During a read operation the cache tag parity RAM 850 drives the cache tag parity bus 880. During a write operation, the CPU 805 drives the cache tag parity bus 880.

During a read operation, the comparator 835 determines whether the cache tag value read from the cache tag value RAM 845 matches the value from the high end 865. If the values match, then a cache hit occurs and the cached data value read from the cached data value RAM 840 via the data bus 825 is used by the CPU 805.

Figure 9:
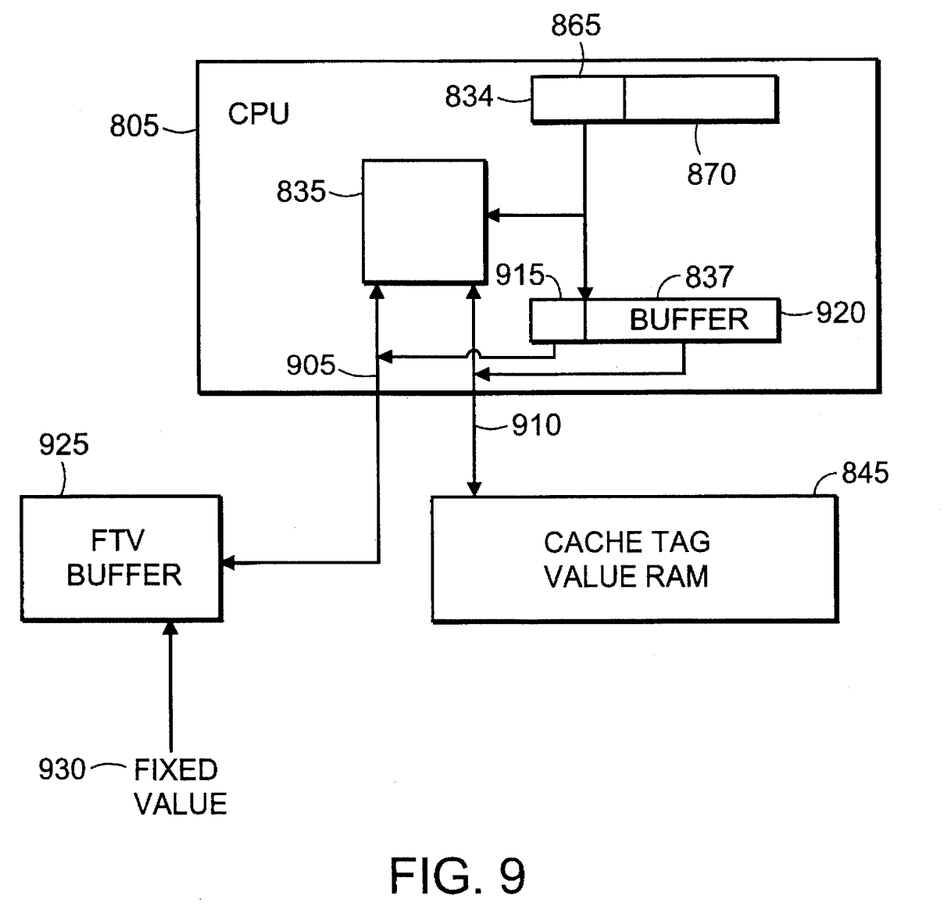
FIG. 9 is a cached CPU where portions of the tag are fixed.

The present invention is illustrated in FIG. 9 which shows the CPU 805 of FIG. 8. The concatenation of a fixed tag value bus 905 and a variable tag value bus 910 is the cache tag value bus 875 of FIG. 8. The buffer 837 is divided into a high section 915 and a low section 920.

The variable cache tag value bus 910 connects the cache tag value RAM 845 and the comparator 835 and the low section 920 of the buffer 837. During a read operation the cache tag value RAM 845 drives the variable cache tag value bus 910. During a write operation, the low section 920 of the buffer 837 drives the variable cache tag value bus 910.

The fixed cache tag value bus 905 connects a fixed tag value buffer 925 and the comparator 835 and the high section 915 of the buffer 837. During a read operation the fixed tag value buffer 925 drives the fixed cache tag value bus 905. During a write operation, the high section 915 of the buffer 837 drives the fixed cache tag value bus 905.

A fixed value 930 is generated by tying inputs to the fixed tag value buffer 925 high or low. The fixed tag value buffer 925 allows the CPU 805 to drive the fixed tag value bus 905 during a write operation by electrically isolating the fixed value 930 from the fixed tag value bus 905.

In FIG. 8, the cache tag value RAM 845 has a width of n bits. In FIG. 9, the cache tag value RAM 845 has a width of p bits and the fixed tag value buffer 925 has a width of n-p bits. The operation within the CPU 805 is not changed with the addition of the fixed tag value buffer 925 and the comparator 835 functions as previously described. In an exemplary embodiment incorporating a MIPS R3000 chip, the fixed tag value buffer 925 has a width of two bits. By using two bits and choosing a fixed value of, for example, 0, the tag parity is preserved. Preserving parity allows a cache hit to occur.

This division of the cache tag value into a fixed and a variable part is used when instructions executed by the CPU 805 specify memory reads, and the instructions occur in a context where the location read from the main memory 815 may have been modified by DMA input. The instructions which the CPU 805 executes specify an address. A field within this address corresponds to the fixed cache tag value bus 905 lines. To avoid stale cache data and to read the newly-arrived DMA input, the field of the address uses a value distinct from the fixed value 930 presented on the fixed tag value bus 905 lines. This forces the comparator 835 to determine that a cache miss has occurred, causing the CPU 805 and the cache 810 to read the newly-arrived data from the main memory 815. Later instructions accessing the same data would use an address with a field value the same as the fixed value 930 presented on the fixed tag value bus 905 lines allowing a cache hit to occur.

The use of n-p bits for the fixed value 930 provides an efficient cache refill mechanism at the expense of a smaller architectural limit on main memory size. In the exemplary R3000 system, this reduced architectural limit is still far greater than the main memory size required for the application.

The present invention may be applied to packet-switching platforms in networks where the switch control processor has a cache memory. The present invention may also be applied to file servers where block indexing information needs to be kept up to date in order to obtain maximum system performance. In file servers indexing information is frequently accessed by the server. The present invention would allow the processor in a file server system to access the most recent indexing information in order to maintain good system performance without expending CPU cycles or cache bandwidth on the consistency of data blocks which are not looked at by the server but are instead forwarded to clients.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. An apparatus for forcing a cache miss, comprising:

a CPU having a comparator means;

a main memory linked to said CPU;

a cache memory having a cache address, said cache address having a first plurality of fields where at least one of said first plurality of fields is set to a fixed value; and, address means of said CPU for specifying a read address, said read address having a second plurality of fields, said address means specifying said at least one said of second plurality of fields a comparison value, said comparator means of said CPU compares said fixed value with said comparison value, said CPU reads data from said cache memory if said fixed value equals said comparison value, said CPU reads data from said main memory if said fixed value does not equal said comparison value.

2. An apparatus as claimed in claim 1, wherein said fixed value is zero.

3. An apparatus as claimed in claim 1, wherein said address means further includes a cache flushing means, said cache flushing means providing said CPU with a sequence of main memory addresses, said CPU flushing said cache upon reading said sequence of addresses.

4. A method for forcing a cache miss, comprising the steps of:

setting at least one of a plurality of fields of a cache address of said cache memory to a fixed value;

executing instructions in a CPU, wherein the instructions specify a memory read address, said memory read address having a plurality of memory address fields, setting by said instructions at least one of said memory address fields to a comparison value;

comparing said fixed value in said fields of said cache memory address with said comparison value in said memory address fields by a comparator in said CPU;

reading data from said cache memory in response to said comparison value equalling said fixed value; and, reading data from a main memory linked to said CPU in response to said comparison value not equalling said fixed value.

5. The method of claim 4, wherein said fixed value is zero.

6. The method of claim 4, further comprising:

executing instructions in said CPU specifying a sequence of main memory addresses, said CPU flushing said cache upon reading said sequence of addresses.

\* \* \* \* \*